(12) United States Patent
Kim et al.

(10) Patent No.: US 11,360,730 B2
(45) Date of Patent: Jun. 14, 2022

(54) MODULAR DISPLAY APPARATUS AND METHOD FOR CONTROLLING THEREOF

(71) Applicant: SAMSUNG ELECTRONICS CO., LTD., Suwon-si (KR)

(72) Inventors: Sangwon Kim, Suwon-si (KR); Youngkook Kim, Suwon-si (KR); Jeongryeol Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/230,059

(22) Filed: Apr. 14, 2021

(65) Prior Publication Data

US 2021/0373838 A1  Dec. 2, 2021

(30) Foreign Application Priority Data

May 29, 2020 (KR) .................... 10-2020-0065018

(51) Int. Cl.
  *G09G 5/00* (2006.01)
  *G06F 3/14* (2006.01)
  *G09G 3/20* (2006.01)
(52) U.S. Cl.
  CPC ............ *G06F 3/1446* (2013.01); *G09G 3/20* (2013.01); *G09G 2300/026* (2013.01); *G09G 2360/04* (2013.01)
(58) Field of Classification Search
  CPC .............................................. G09G 2300/026
  See application file for complete search history.

(56) References Cited

U.S. PATENT DOCUMENTS

| 7,499,272 | B2 | 3/2009 | Searby et al. |
| 8,810,738 | B2 | 8/2014 | Park et al. |
| 9,354,840 | B2 | 5/2016 | Seo et al. |
| 10,128,670 | B2 | 11/2018 | Ban et al. |
| 10,235,120 | B2 | 3/2019 | Cho et al. |
| 10,712,992 | B2 | 7/2020 | Seo et al. |
| 11,036,455 | B2 | 6/2021 | Kim et al. |
| 2003/0146882 | A1 | 8/2003 | Ogino et al. |

(Continued)

FOREIGN PATENT DOCUMENTS

| EP | 3680932 A1 | 7/2020 |
| JP | 2004280119 A | 10/2004 |

(Continued)

OTHER PUBLICATIONS

International Search Report (PCT/ISA/210) and Written Opinion (PCT/ISA/237) dated Jul. 1, 2021 issued by the International Searching Authority in International Application No. PCT/KR2021/004319.

(Continued)

*Primary Examiner* — Carl Adams
(74) *Attorney, Agent, or Firm* — Sughrue Mion, PLLC

(57) ABSTRACT

A modular display apparatus may include a docking station having a plurality of spaces; a plurality of back plates provided in the plurality of spaces; a plurality of power boards provided on the plurality of back plates, each power board of the plurality of power boards including an interface including a plurality of pins; a plurality of display apparatuses connected to the interfaces of the plurality of power boards and mounted in the plurality of spaces; and a processor.

18 Claims, 12 Drawing Sheets

(56) References Cited

U.S. PATENT DOCUMENTS

| | | |
|---|---|---|
| 2005/0093768 A1 | 5/2005 | Devos et al. |
| 2007/0097618 A1 | 5/2007 | Searby et al. |
| 2008/0174515 A1 | 7/2008 | Matthies et al. |
| 2008/0303785 A1* | 12/2008 | Yun .................. G09G 5/006 345/156 |
| 2015/0186096 A1 | 7/2015 | Hall |
| 2016/0034242 A1 | 2/2016 | Cho et al. |
| 2017/0063117 A1 | 3/2017 | Ban et al. |
| 2018/0336805 A1* | 11/2018 | Zolty .................. G09F 9/3026 |
| 2019/0384559 A1 | 12/2019 | Kim et al. |
| 2020/0193877 A1 | 6/2020 | Kim |

FOREIGN PATENT DOCUMENTS

| | | |
|---|---|---|
| KR | 1020070046713 A | 5/2007 |
| KR | 10-2014-0067343 A | 6/2014 |
| KR | 1020160016523 A | 2/2016 |
| KR | 10-1666915 B1 | 10/2016 |
| KR | 10-2017-0025086 A | 3/2017 |
| KR | 10-1748550 B1 | 6/2017 |
| KR | 10-2019-0141379 A | 12/2019 |
| KR | 1020190141384 A | 12/2019 |
| KR | 102073373 B1 | 2/2020 |
| WO | 2019045549 A1 | 3/2019 |

OTHER PUBLICATIONS

Communication dated Jul. 27, 2021 issued by the Korean Intellectual Property Office in Korean Application No. 10-2020-0065018.
Communication dated Jan. 26, 2022 by the Korean Intellectual Property Office in Korean Patent English Application No. 10-2020-0065018.
Communication dated Mar. 22, 2022 by the Korean Intellectual Property Office in Korean Patent English Application No. 10-2020-0065018.

* cited by examiner

FIG. 6

| SIGNAL | LOCATION INFORMATION |
|---|---|
| A first pin: Low<br>A second pin: High | UPPER LEFT SPACE |
| A first pin: High<br>A second pin: High | UPPER RIGHT SPACE |
| A first pin: Low<br>A second pin: Low | LOWER LEFT SPACE |
| A first pin: High<br>A second pin: Low | LOWER RIGHT SPACE |

MODULAR DISPLAY APPARATUS AND METHOD FOR CONTROLLING THEREOF

CROSS-REFERENCE TO RELATED APPLICATION(S)

This application is based on and claims priority under 35 U.S.C. § 119 to Korean Patent Application No. 10-2020-0065018, filed on May 29, 2020, in the Korean Intellectual Property Office, the disclosure of which is incorporated by reference herein in its entirety.

BACKGROUND

1. Field

The disclosure relates to a modular display apparatus and a control method thereof, and more particularly, to a modular display apparatus configured to display an image through a plurality of display apparatuses and a control method thereof

2. Description of Related Art

With the development of electronic technology, various electronic devices have been developed. Recently, a modular display apparatus configured to display an image through a plurality of display apparatuses has been particularly developed.

Such a modular display apparatus may provide visual satisfaction to a user by displaying an image through a large screen in which a plurality of display apparatuses are combined.

The modular display apparatus is an apparatus configured to display a single image through a plurality of display apparatuses. Coordinate setting is typically required for each display apparatus because it is necessary to divide the image into a plurality of images corresponding to each display apparatus, and to display the divided plurality of images based on coordinate information of the plurality of display apparatuses.

For this operation, a related art modular display apparatus sets coordinates of a plurality of display apparatuses based on a user input for setting coordinates. However, this causes inconvenience in that the user has to set coordinates of all display apparatuses one by one, and in particular, it is difficult in reality for a general user who is not an expert to set the coordinates of the display apparatus.

SUMMARY

Provided are a modular display apparatus configured to set coordinates of a plurality of display apparatuses without a user input, and a control method thereof Additional aspects will be set forth in part in the description which follows and, in part, will be apparent from the description, or may be learned by practice of the presented embodiments.

According to an aspect of an example embodiment, a modular display apparatus may include a docking station having a plurality of spaces; a plurality of back plates provided in the plurality of spaces; a plurality of power boards provided on the plurality of back plates, each power board of the plurality of power boards including an interface including a plurality of pins; a plurality of display apparatuses connected to the interfaces of the plurality of power boards and mounted in the plurality of spaces; and a processor. A plurality of first areas of the plurality of power boards includes a plurality of conductive members. Different signals are applied to at least one pin of the plurality of pins according to whether electrical contact exists between the plurality of conductive members provided in the plurality of first areas and a plurality of second areas of the plurality of back plates corresponding to the plurality of first areas. The processor is configured to control the plurality of display apparatuses based on a signal applied to the at least one pin included in the respective interfaces. Remaining pins other than the at least one pin included in the respective interfaces are configured to provide power to respective display apparatuses connected to the respective interfaces of the power boards.

Based on a conductive member provided in a first area among the plurality of first areas of a power board being in electrical contact with a second area among the plurality of second areas of a back plate corresponding to the first area, a low signal is applied to a pin electrically connected to the conductive member provided in the first area among the at least one pin. Based on the conductive member provided in the first area among the plurality of first areas of the power board not being in electrical contact with a second area among the plurality of second areas of the back plate corresponding to the first area, a high signal is applied to the pin electrically connected to the conductive member provided in the first area among the at least one pin.

The plurality of first areas of the back plate are configured to be connected to a ground. In an absence of electrical contact, a voltage greater than zero is applied to the at least one pin, and in a presence of electrical contact, a voltage of zero is applied to the at least one pin as the at least one pin that is connected to the ground.

Areas of the plurality of back plates in electrical contact with the plurality of conductive members of the power board is different for each back plate of the plurality of back plates according to a location of a space in which the back plate is provided in the docking station.

A plurality of transmission boards connected to the plurality of power boards and the processor, the plurality of transmission boards being configured to transmit respective images to the plurality of display apparatuses. The signal applied to the at least one pin is transmitted to the processor through the plurality of transmission boards. The processor is configured to transmit a respective image signal corresponding to a respective location of a respective space in which each respective display apparatus is mounted in the docking station based on a respective applied signal to the respective display apparatuses through the plurality of transmission boards. Each display apparatus of the plurality of display apparatuses is configured to display a respective image based on the respective image signal received from a respective transmission board.

The image displayed by each display apparatus of the display apparatuses based on image signals received from each transmission board of the plurality of transmission boards is a partial image corresponding to a location of a space in which each display apparatus is mounted in the docking station among the images displayed through the plurality of display apparatuses.

The processor is configured to, based on a signal change occurring in the at least one pin of the plurality of pins as the display apparatus is connected to the interface, supply power to the display apparatus connected to the interface of the power board through the remaining pins.

The processor is configured to, based on a low signal being applied to the at least one pin as the display apparatus is connected to the interface, supply power to the display apparatus connected to the interface of the power board through the remaining pins.

The processor is configured to electrically connect to the plurality of power boards through a plurality of connectors, based on the signal applied to the at least one pin, acquire location information of the plurality of power boards electrically connected to the plurality of connectors, and transmit signals for controlling the plurality of display apparatuses connected to the interfaces of the plurality of power boards to the plurality of display apparatuses through the plurality of connectors based on the location information.

The processor is configured to based on the location information, transmit an image signal corresponding to a location of a space in which each display apparatus is mounted from the docking station to a plurality of transmission boards, and each display apparatus of the plurality of display apparatuses is configured to display images based on the image signal received from each transmission board of the plurality of transmission boards.

According to an aspect of an example embodiment, method of controlling a modular display apparatus may include identifying a signal applied to at least one pin of a plurality of pins included in respective interfaces of a plurality of power boards; and based on the signal applied to the at least one pin, controlling a plurality of display apparatuses connected to the respective interfaces of the plurality of power boards. The modular display apparatus may include a docking station having a plurality of spaces; a plurality of back plates provided in the plurality of spaces; and the plurality of display apparatuses connected to the respective interfaces and mounted in the plurality of spaces. The plurality of power boards are provided on the plurality of back plates. A plurality of first areas of the plurality of power boards includes a plurality of conductive members. Different signals are applied to the at least one pin of the plurality of pins according to whether electrical contact exists between the plurality of conductive members provided in the plurality of first areas and a plurality of second areas of the plurality of back plates corresponding to the plurality of first areas. Remaining pins other than the at least one pin included in the respective interfaces are configured to provide power to the respective display apparatuses connected to the respective interfaces of the power boards.

Based on a conductive member provided in a first area among the plurality of first areas of the power board being in electrical contact with a second area among the plurality of second areas of a back plate corresponding to the first area, a low signal is applied to a pin electrically connected to the conductive member provided in the first area among the at least one pin. Based on the conductive member provided in the first area among the plurality of first areas of the power board not being in electrical contact with a second area among the plurality of second areas of the back plate corresponding to the first area, a high signal is applied to the pin electrically connected to the conductive member provided in the first area among the at least one pin.

The plurality of first areas of the back plate are configured to be connected to a ground. In an absence of electrical contact, a voltage greater than zero is applied to the at least one pin, and in a presence of electrical contact, a voltage of zero is applied to the at least one pin as the at least one pin that is connected to the ground.

Areas of the plurality of back plates in electrical contact with the plurality of conductive members of the power board is different for each back plate of the plurality of back plates according to a location of a space in which the back plate is provided in the docking station.

The method may include transmitting a respective image signal corresponding to a respective location of a respective space in which each respective display apparatus is mounted in the docking station based on a respective applied signal to the respective display apparatuses through a plurality of transmission boards. Each display apparatus of the plurality of display apparatuses is configured to display a respective image based on the respective image signal received from a respective transmission board of the plurality of transmission boards.

The image displayed by each display apparatus of the display apparatuses based on image signals received from each transmission board of the plurality of transmission boards is a partial image corresponding to a location of a space in which each display apparatus is mounted in the docking station among the images displayed through the plurality of display apparatuses.

The supplying power comprises, based on a signal change occurring in the at least one pin of the plurality of pins as the display apparatus is connected to the interface, supplying power to the display apparatus connected to the interface of the power board through the remaining pins.

The supplying power comprises, based on a low signal being applied to the at least one pin as the display apparatus is connected to the interface, supplying power to the display apparatus connected to the interface of the power board through the remaining pins.

The method may include based on the signal applied to the at least one pin, acquiring location information of the plurality of power boards electrically connected to a plurality of connectors, and transmitting signals for controlling the plurality of display apparatuses connected to the interfaces of the plurality of power boards to the plurality of display apparatuses through the plurality of connectors based on the location information.

The transmitting comprises, based on the location information, transmitting an image signal corresponding to a location of a space in which each display apparatus is mounted from the docking station to a plurality of transmission boards. Each display apparatus of the plurality of display apparatuses is configured to display images based on the image signal received from each transmission board of the plurality of transmission boards.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a view illustrating a table in which information about different spaces is matched for each combination of a low signal and a high signal according to an embodiment;

DETAILED DESCRIPTION

The terms used in the disclosure and the claims are general terms selected in consideration of the functions of the various example embodiments of the disclosure. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the present specification, and may also be construed based on general contents of the present specification and a typical technical concept in the art unless the terms are not specifically defined.

In describing example embodiments, detailed description of relevant known functions or components may be omitted if it would obscure the description of the subject matter.

Further, embodiments of the disclosure will be described in detail below with reference to the accompanying drawings, but the disclosure is not limited by the embodiments.

Hereinafter, certain embodiments will now be explained in detail with reference to the accompanying drawings.

Figure 1A:
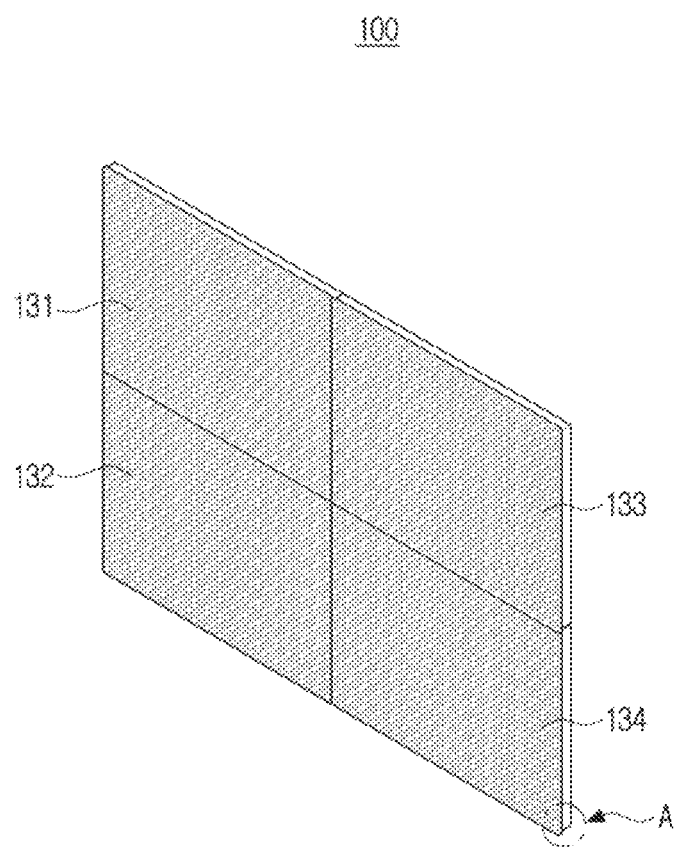
FIG. 1A is a view illustrating a display apparatus according to an embodiment.
Figure 1B:
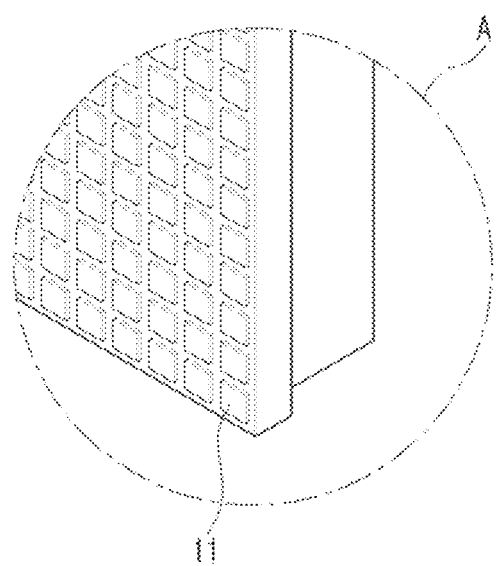
FIG. 1B is a view illustrating a pixel of a display apparatus according to an example embodiment.
Figure 1C:
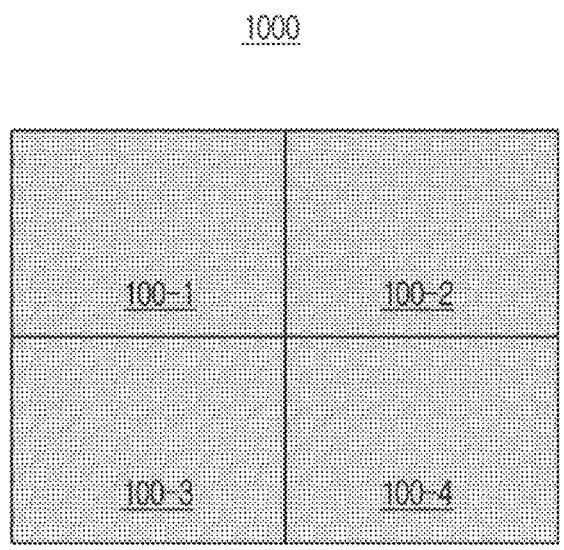
FIG. 1C is a view illustrating a modular display apparatus to which a display apparatus according to an embodiment is provided.
Figure 1D:
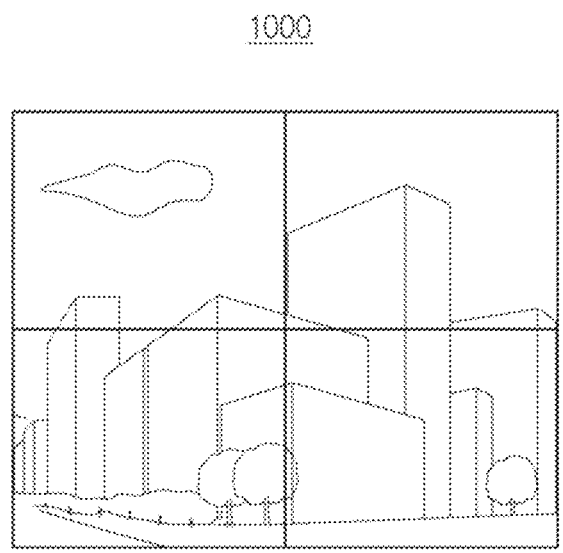
FIG. 1D is a view illustrating a modular display apparatus displaying an image according to an embodiment.

FIGS. 1A and 1D are views illustrating a display apparatus, according to various embodiments.

The display apparatus 100 according to an embodiment may include one display module or a plurality of display modules.

Referring to FIG. 1A, a display apparatus 100 according to an embodiment of the disclosure may include four display modules 131 to 134. Here, each of the display modules 131 to 134 may be connected to form a single display.

Each of the display modules 131 to 134 may be implemented as a light emitting diode (LED) display module including an inorganic LED.

Specifically, referring to FIG. 1B, each of the display modules 131 to 134 may be implemented as an LED display module including a plurality of LEDs 11 that implement sub-pixels of a red LED, a green LED, and a blue LED as one pixel.

The plurality of pixels may be arranged in a matrix form (e.g., M×N, where M and N are natural numbers). Specifically, the matrix may be in the form of a rectangular arrangement (e.g., M=N, where M and N are natural numbers, a 16×16 arrangement, 24×24 array, etc.), as well as a different arrangement (e.g., M≠N, where M and N are natural numbers).

For example, the LED of the LED display module according to an embodiment of the disclosure may be implemented as a micro-LED. The micro-LED may be an LED having a size of about 5 to 100 micrometers, and may be a micro-light emitting device that emits light without a color filter.

An LED display module is only an embodiment, and the display module may be implemented as a liquid crystal panel (LCD), an organic LED (OLED), an active-matrix OLED (AMOLED) panel, a plasma display panel (PDP), or the like. Hereinafter, for convenience of description, the display module according to an embodiment of the disclosure is described as being an LED display module.

Referring to FIG. 1A, the display apparatus 100 according to an embodiment of the disclosure may be implemented in a form in which a plurality of display modules 131 to 134 are combined in a 2×2 array.

However, the 2×2 array of LED display modules is only an embodiment, and the arrangement type and number of LED display modules may be variously changed according to other embodiments.

The display apparatus 100 may be mounted (or coupled) to a docking station of the modular display apparatus 1000. For this operation, the display apparatus 100 may include a mounting unit that is configured to mount to the docking station. The mounting unit is made of a magnetic material, and the display apparatus 100 may be mounted on the docking station through a combination of the mounting unit and the magnetic material of the docking station. As an example, the magnetic material may be included in an outer edge of the display apparatus 100, but is not limited thereto.

In addition, the mounting unit including a magnetic material may be mounted on the docking station of the modular display apparatus 1000 through various types of mounting units such as a screw-type mounting unit, a slice-type mounting unit, or the like.

A plurality of display apparatuses 100 of the disclosure may be provided, and the plurality of display apparatuses may be mounted on the docking station divided into a plurality of spaces.

Accordingly, the embodiments of the disclosure may implement the modular display apparatus 1000 equipped with a plurality of display apparatuses 100. The modular display apparatus 1000 may be referred to as a wall display or a video wall.

For example, referring to FIG. 1C, the embodiments of the disclosure may implement the modular display apparatus 1000 in which a plurality of display apparatuses 100-1 to 100-4 are mounted on the docking station in a 2×2 array. The modular display apparatus 1000 having a 2×2 array is only an embodiment, and the arrangement type and number of the display apparatuses may be variously changed according to other embodiments.

The modular display apparatus 1000 may display an image through a display module included in each of a plurality of display apparatuses. The image may be an image received from an external device (e.g., a set-top box, a computer, a server, etc.), or an image previously stored in the modular display apparatus 1000.

Specifically, a processor included in the modular display apparatus 1000 may transmit an image signal corresponding to each display apparatus to the plurality of display apparatuses, and the plurality of display apparatuses may display an image based on the received image signal. Accordingly, as illustrated in FIG. 1D, the modular display apparatus 1000 may display an image through the plurality of display apparatuses.

The display apparatus 100 of the disclosure is one of the plurality of display apparatuses constituting the modular display apparatus 1000 and may be referred to as a sub-screen or a cabinet.

Figure 2:
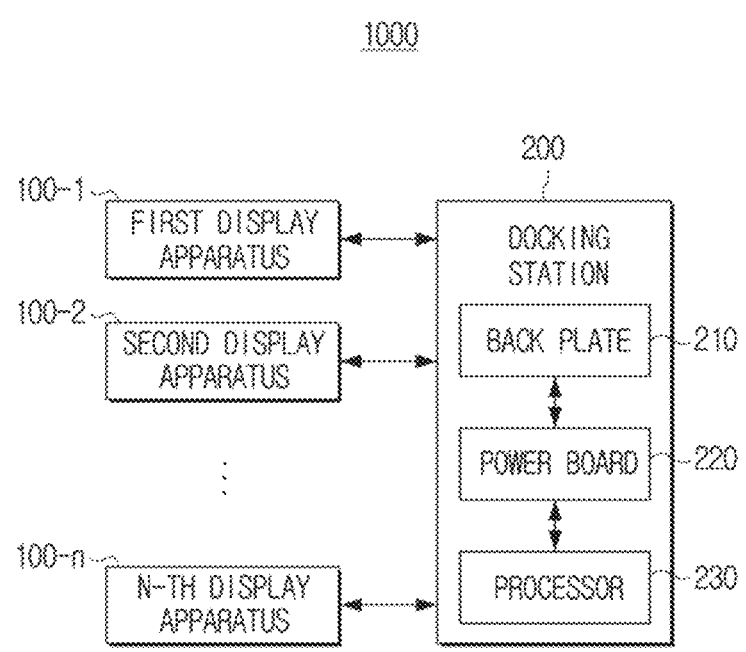
FIG. 2 is a block diagram illustrating a modular display apparatus according to an embodiment.

FIG. 2 is a block diagram illustrating a modular display apparatus according to an embodiment.

Referring to FIG. 2, a modular display apparatus 1000 according to an embodiment of the disclosure may include a first display apparatus 100-1, a second display apparatus 100-2, an N-th display apparatus 100-n, and a docking station 200.

The docking station 200 may be divided into a plurality of spaces. Specifically, the docking station 200 may be divided into a plurality of spaces in which the plurality of display apparatuses 100-1 through 100-n may be mounted.

Figure 3:
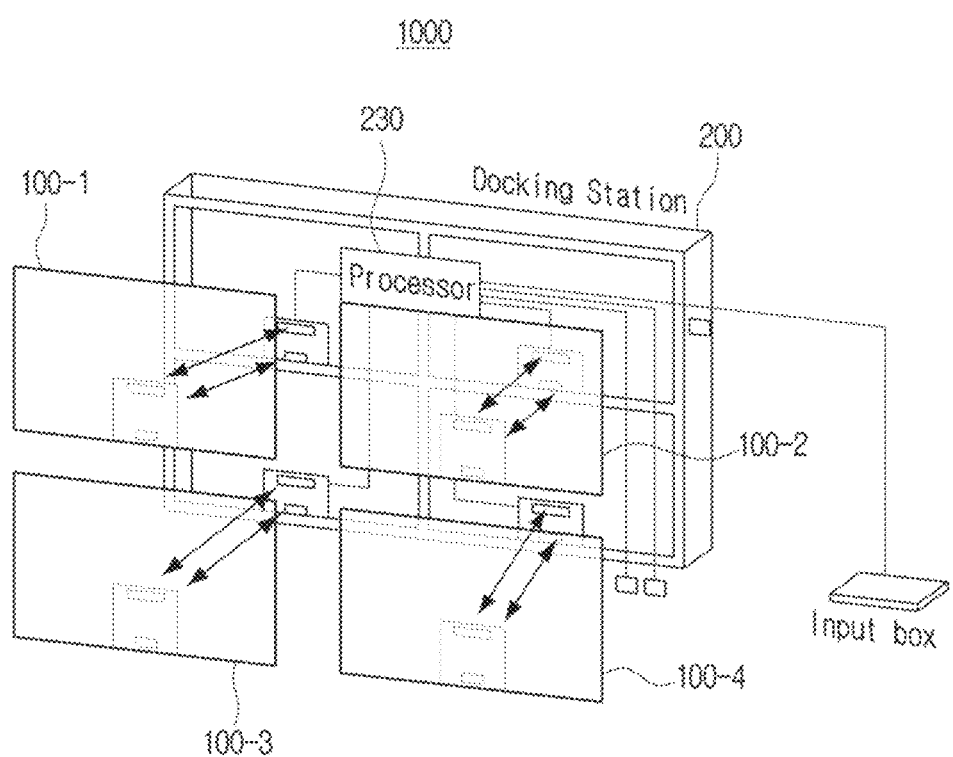
FIG. 3 is a view illustrating a modular display apparatus according to an embodiment.

For example, referring to FIG. 3, the docking station 200 may be divided into four spaces in which four display apparatuses 100-1, 100-2, 100-3, and 100-4 may be mounted. In this case, a first display apparatus 100-1 may be mounted in a first space (e.g., an upper left space) of the docking station 200, a second display apparatus 100-2 may be mounted in a second space (e.g., an upper right space), a third display apparatus 100-3 may be mounted in a third space (e.g., a lower left space) of the docking station 200, and a fourth display apparatus 100-4 may be mounted in a fourth space (e.g., a lower right space) of the docking station 200.

The docking station 200 may be divided into a plurality of spaces different from that of FIG. 3.

The plurality of display apparatuses 100-1 through 100-n may display various images. The image may be a still image or a moving image, and the plurality of display apparatuses 100-1 through 100-n may display various images such as broadcast content, multimedia content, or the like. In addition, the plurality of display apparatuses 100-1 through 100-n may display a user interface (UI) and an icon.

For this operation, the plurality of display apparatuses 100-1 through 100-n may include a timing controller, and the timing controller may receive an image signal from the processor 230. For example, a timing controller of the first display apparatus 100-1 may receive a first image signal corresponding to the first display apparatus 100-1 from the processor 230, a timing controller of the second display apparatus 100-2 may receive a second image signal corresponding to the second display apparatus 100-2 from the processor 230, a timing controller of the third display apparatus 100-3 may receive a third image signal corresponding to the third display apparatus 100-3 from the processor 230, and a timing controller of the fourth display apparatus 100-4 may receive a fourth image corresponding to the fourth display apparatus 100-4 from the processor 230.

In addition, the timing controller included in the plurality of display apparatuses 100-1 through 100-n may control an LED driver integrated circuit (IC) included in each display apparatus 100-1 through 100-n based on the image signal received from the processor 230, and the LED driver IC may display an image by controlling light emission of a plurality of pixels included in the plurality of display apparatuses 100-1 through 100-n under control of the timing controller.

As an example, the LED driver IC included in the first display apparatus 100-1 may display a first image by controlling the light emission of a plurality of pixels included in the first display apparatus 100-1 under control of the timing controller included in the first display apparatus 100-1, the LED driver IC included in the second display apparatus 100-2 may display a second image by controlling the light emission of a plurality of pixels included in the second display apparatus 100-2 under control of the timing controller included in the second display apparatus 100-2, the LED driver IC included in the third display apparatus 100-3 may display a third image by controlling the light emission of a plurality of pixels included in the third display apparatus 100-3 under control of the timing controller included in the third display apparatus 100-3, and the LED driver IC included in the fourth display apparatus 100-4 may display a fourth image by controlling the light emission of a plurality of pixels included in the fourth display apparatus 100-4 under control of the timing controller included in the fourth display apparatus 100-4.

For this operation, the plurality of display apparatuses 100-1 through 100-n may receive power from a plurality of power boards 220 provided in each space of the docking station 200. Specifically, each of the plurality of display apparatuses 100-1 through 100-n may include a board for receiving power, and the board for receiving power may be connected to the interface of the power board 220 provided in each space of the docking station 200, and receive power from the power board 220. In addition, the timing controller may be connected to the board for receiving power, and may receive power from the board for receiving power. According to an embodiment, a configuration for receiving power may be included in the timing controller board.

In addition, the plurality of display apparatuses 100-1 through 100-n may receive an image signal from a transmission board provided in each space of the docking station 200. Specifically, each of the plurality of display apparatuses 100-1 through 100-n may include a reception board, and an image signal may be transmitted to the reception board wirelessly through an antenna included in the transmission board. According to another embodiment, the image signal may be transmitted by wire. In addition, the timing controller may be connected to the reception board, receive an image signal from the reception board, and display an image based on the image signal received from the reception board. According to an embodiment, a configuration for receiving an image signal may be included in the timing controller board.

The plurality of display apparatuses 100-1 through 100-n may be realized as various kinds of displays, such as a Liquid Crystal Display (LCD), an Organic Light-Emitting Diode (OLED) display, a Liquid Crystal on Silicon (LCoS) display, a Digital Light Processing (DLP) display, or the like. Further, the display may include a driver circuit that may be realized as an A-Si thin-film transistor (TFT), a low temperature poly silicon (LTPS) TFT, an organic TFT (OTFT), a backlight unit, or the like.

The display module may be a touch screen including a touch sensor.

Referring to FIG. 2, the docking station 200 may include a back plate 210, a board 220, and a processor 230.

The back plate 210 may be provided in each of the plurality of spaces of the docking station 200 and installed (or fixed) in one area of a front surface of the docking station 200 (e.g., a surface to which the display apparatus 100 is coupled).

In addition, the back plate 210 may include a conductive member. The conductive member may be, for example, iron, copper, aluminum, or the like, but is not limited thereto.

In addition, the conductive member may be electrically connected to a ground. For this operation, the back plate 210 may be implemented to be grounded with the ground, and a conductive member of the back plate 210 may be positioned on the back plate 210 to be electrically connected to the ground.

Depending on the embodiment, the above-described conductive member may be a component of the back plate 210.

The conductive member may be disposed at different positions for each of a plurality of spaces of the docking station 200.

Figure 4:
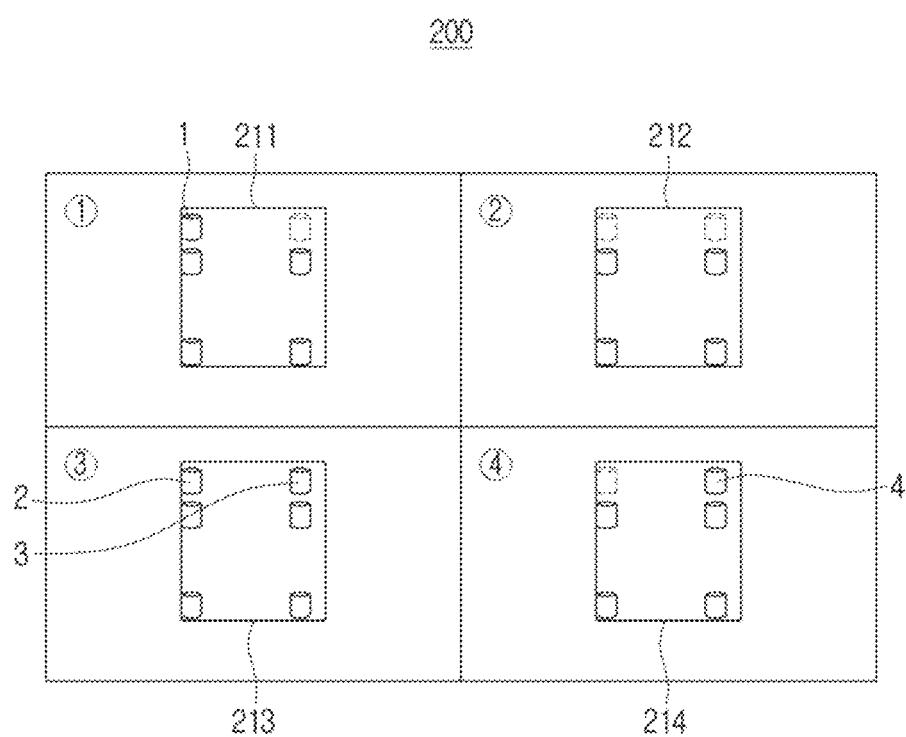
FIG. 4 is a view illustrating a back plate according to an embodiment.

For example, referring to FIG. 4, the docking station 200 may include four spaces that can be combined with four display apparatuses 100-1, 100-2, 100-3, and 100-4. In addition, back plates 211, 212, 213, and 214 are disposed in each space, and the back plates 211, 212, 213, and 214 of each space may include conductive members disposed at different positions.

Specifically, in the case of a first back plate 211, a conductive member 1 may be located in an upper left area. In the case of a third back plate 213, conductive members 2 and 3 may be located in an upper left area and an upper right area. In the case of a fourth back plate 214, a conductive member 4 may be located in an upper right area.

Also, the back plate in one space may not include a conductive member. For example, the second back plate 212 of FIG. 4 may not include a conductive member.

The back plate 210 may further include a conductive member in one area of the back plate 210 in addition to the conductive members 1, 2, 3, and 4 described above.

For example, referring to FIG. 4, the first back plate 211 may further include four conductive members in addition to the first conductive member 1, the third back plate 213 may further include four conductive members in addition to the second conductive member 2 and the third conductive member 3, and the fourth back plate 214 may further include four conductive members four conductive members in addition to the fourth conductive member 4. In addition, the second back plate 212 may also further include four conductive members in an area other than the above-described upper area.

The conductive members other than the conductive members 1, 2, 3, and 4 may prevent the power board 220 from tilting at a certain slope when the power board 220 is coupled to the back plate 210. According to an embodiment, the conductive members other than the conductive members 1, 2, 3, and 4 may be implemented as non-conductive members.

The power board 220 may be coupled to the back plate 210. In one embodiment, the power board 220 may be coupled to the back plate 210 through a screw-type coupling unit, but is not necessarily limited thereto, and the power board 220 may be coupled to the back plate 210 through various types of coupling units such as a slice-type coupling unit. Accordingly, the power board 220 may be provided on the back plate 210.

The power board 220 may include a plurality of conductive members. Specifically, the power board 220 may include a plurality of conductive members in a plurality of areas of the power board 220. The conductive member may be, for example, a copper foil, but is not limited thereto.

Figure 5:
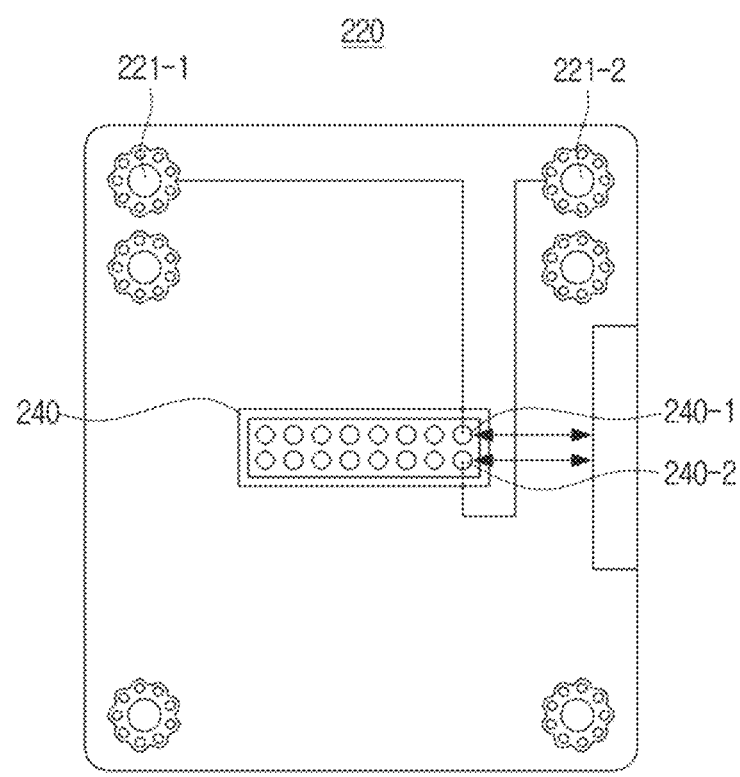
FIG. 5 is a view illustrating a power board according to an embodiment.

Referring to FIG. 5, the power board 220 may include a first conductive member 221-1 on the upper left area, and include a second conductive member 221-2 in the upper right area. According to an embodiment, as shown in FIG. 5, the power board 220 may further include a plurality of conductive members under the first conductive member 221-1 and the second conductive member 221-2.

In addition, the power board 220 may include an interface 240 including a plurality of pins. Here, the pin may be, for example, a pogo pin, but is not limited thereto.

In addition, some pins of the interface 240 may be electrically connected to a conductive member of the power board 220.

For example, referring to FIG. 5, a first pin 240-1 may be electrically connected to the first conductive member 221-1, and a second pin 240-2 may be electrically connected to the second conductive member 221-2.

In addition, different signals may be applied to the pins electrically connected to the conductive member of the power board 220 according to whether the conductive member of the power board 220 and the conductive member of the back plate 210 are in contact with each other.

Specifically, when the conductive member of the power board 220 and the conductive member of the back plate 210 are in contact with each other, a low signal may be applied to a pin electrically connected to the conductive member of the power board 220. For example, when the conductive member of the power board 220 and the conductive member of the back plate 210 are in contact with each other, a voltage of 0 V may be applied to a pin electrically connected to the conductive member of the power board 220.

As described above, the conductive member of the back plate 210 is in a grounded state. When the conductive member of the power board 220 contacts the conductive member of the back plate 210, a low signal may be applied to the pin electrically connected to the conductive member of the power board 220.

When the conductive member of the power board 220 and the conductive member of the back plate 210 are not in contact each other, a high signal may be applied to the pin electrically connected to the conductive member of the power board 220. For example, when the conductive member of the power board 220 and the conductive member of the back plate 210 are not in contact, a voltage greater than zero may be applied to the pin electrically connected to the conductive member of the power board 220.

For this operation, the conductive member of the power board 220 may be electrically connected to a pull-up resistor. In addition, a high signal corresponding to a voltage (e.g., 3.3V, etc.) applied to the pull-up resistor may be applied to the pin electrically connected to the conductive member of the power board 220.

As described above, the conductive member of the back plate 210 may be disposed at different positions for each of the plurality of spaces of the docking station 200.

Accordingly, signals applied to the pins of the power board 220 may be different for each of the plurality of spaces.

For example, a case in which a power board 220 of FIG. 5 is coupled to the back plates 211, 212, 213, and 214 of FIG. 4 will be described. In this case, a low signal may be applied to the first pin 240-1 of the power board 220 coupled to the first back plate 211 based on contact with the first conductive member 221-1 and the conductive member 1(1), and a high signal may be applied to the second pin 240-2 since there is no conductive member in contact with the second conductive member 221-2.

Since there is no conductive member in contact with the first conductive member 221-1 and the second conductive member 221-2, a low signal may be applied to the first and second pins 240-1 and 240-2 of the power board 220 coupled to the second back plate 212.

A low signal may be applied to the first pin 240-1 of the power board 220 coupled to the third back plate 213 based on the contact with the first conductive member 221-1 and the conductive member 2(2), and a low signal may be applied to the second pin 240-2 based on the contact between the second conductive member 221-2 and the conductive member 3(3).

Since the first pin 240-1 of the power board 220 coupled to the fourth back plate 214 does not have a conductive member in contact with the first conductive member 221-1, a high signal may be applied, and a low signal may be applied to the second pin 240-2 based on the contact between the second conductive member 221-2 and the conductive member 4(4).

Although it has been described that the conductive member is included in the power board 220, the conductive member may be included in a board separate from the power board 220.

The description above will be described based on an area of the back plate 210 and an area of the power board 220 as follows.

As described above, a plurality of conductive members may be included in the plurality of areas of the power board 220. For example, referring to FIG. 5, the first conductive member 221-1 may be included in the first area of the power board 220, and the second conductive member 221-2 may be included in the second area of the power board 220.

In addition, different signals may be applied to pins connected to the conductive member of the power board 220 among the plurality of pins included in the interface 240 of the power board 220, depending on whether electrical contact between the plurality of conductive members provided in the plurality of areas of the power board 220 and the plurality of areas of the back plate 210 corresponding to the plurality of areas.

Specifically, when the conductive member provided in the first area of the plurality of areas of the power board 220 is in electrical contact with the second area corresponding to the first area of the plurality of areas of the back plate 210, a low signal may be applied to a pin electrically connected to the conductive member provided in the first area.

For example, when the power board 220 of FIG. 5 is coupled to the first back plate 211 of FIG. 4, the first conductive member 221-1 provided in the first area may be electrically contacted with the second area of the first back plate 211 corresponding to the first area (e.g., the area where the conductive member 1(1) is located), and thus a low signal may be applied to the first pin 1 240-1 electrically connected to the first conductive member 221-1 provided in the first area.

In addition, when the conductive member provided in the first area of the plurality of areas of the power board 220 does not electrically contact the second area corresponding to the first area of the plurality of areas of the back plate 210, a high signal may be applied to a pin electrically connected to the conductive member provided in the first area.

For example, when the power board 220 of FIG. 5 is coupled to the first back plate 211 of FIG. 4, the second conductive member 221-2 provided in the first area may not be electrically connected to the second area of the first back plate 211 (e.g., an upper right area where the conductive member is not located), and thus, a high signal may be applied to the second pin 240-2 electrically connected to the second conductive member 221-2 provided in the first area.

In addition, the area of the back plate 210 electrically coupled to the plurality of conductive members of the power board 220 may be different for each of the plurality of back plates according to the location of the space in which the back plate 210 is provided in the docking station 200.

For example, referring to FIG. 4, among the plurality of areas of the first back plate 211, an area in electrical contact with the plurality of conductive members of the power board 220 may be an upper left area. There may be no areas in electrical contact with the plurality of conductive members of the power board 220 among the plurality of areas of the second back plate 212. Among the plurality of areas of the third back plate 213, an area in electrical contact with the plurality of conductive members of the power board 220 may be an upper left area and a right upper area. Among the plurality of areas of the fourth back plate 214, an area in electrical contact with the plurality of conductive members of the power board 220 may be an upper right area.

The processor 230 controls overall operations of the display apparatus 1000. The processor 230 may include one or more of a central processing unit (CPU), an application processor (AP), and communication processor (CP). Alternatively, the processor 230 may be a field programmable gate array (FPGA) designed or programmed to implement various functions to be described below.

The processor 230 may, for example, control a number of hardware or software elements connected to the processor 230 by driving an operating system or application program, and perform various data processing and calculations. Further, the processor 230 may load and process a command or data received from at least one of the other components to a volatile memory and store diverse data in a non-volatile memory.

The processor 230 may transmit a plurality of signals to the plurality of display apparatuses 100-1 through 100-n. The signal may be an image signal, and may be a variety of signals for controlling the plurality of display apparatuses 100-1 through 100-n (e.g., an on signal, an off signal, an Internet Protocol (IP) setting signal, etc.)

Specifically, the processor 230 may transmit an image signal corresponding to a location of a space in which each display apparatus is mounted from the docking station 200 to each display apparatus.

For this operation, the processor 230 may identify a space (or coordinates) in which each display apparatus is mounted in the docking station 200.

Specifically, the processor 230 may identify a space where each display apparatus is mounted based on a signal applied to at least one pin electrically connected to the conductive member among a plurality of pins included in the interface 240 of the power board 220.

As described above, one of a low signal and a high signal may be applied to a pin electrically connected to the conductive member among the plurality of pins of the power board 220, based on whether or not the back plate 210 is in contact.

For example, when a low signal is referred to as "0" and a high signal is referred to as "1," a signal of "0" or "1" may be applied to a pin electrically connected to the conductive member of the power board 220.

In this case, the processor 230 may identify a space in which the display apparatus connected to the power board 220 is mounted, based on the signal applied to the pin of the power board 220.

Specifically, the processor 230 may identify a space in which the display apparatus is mounted, based on a table in which information on different spaces is matched for each combination of the low signal and the high signal.

For example, the modular display apparatus 1000 of the disclosure may store a table in which information on different spaces is matched for each combination of a low signal and a high signal, as shown in FIG. 6.

In this case, when a low signal is applied to the first pin 240-1 of the power board 220 and a high signal is applied to the second pin 240-2, the processor 230 may identify that the corresponding power board 220 is located in the upper left space of the plurality of spaces of the docking station 200 (alternatively, the processor may identify that the display apparatus 100 connected to the corresponding power board 220 is mounted in the upper left space of the plurality of spaces of the docking station 200). When a high signal is applied to the first pin 240-1 of the power board 220 and a high signal is applied to the second pin 240-2, the processor may identify that the power board 220 is located in the upper right space among the plurality of spaces of the docking station 200 (alternatively, the processor may identify that the display apparatus 100 connected to the corresponding power board 220 is mounted in the upper right space among the plurality of spaces of the docking station 200). When a low signal is applied to the first pin 240-1 of the power board 220 and a low signal is applied to the second pin 240-2, the processor may identify that the power board 220 is located in the lower left space among the plurality of spaces of the docking station 200 (alternatively, the processor may identify that the display apparatus 100 connected to the corresponding power board 220 is mounted in the lower left space of the plurality of spaces of the docking station 200). When a high signal is applied to the first pin 240-1 of the power board 220 and a low signal is applied to the second pin 240-2, the processor may identify that the power board 220 is located in the lower right space among the plurality of spaces 200 of to the docking station 200 (alternatively, the processor may identify that the display apparatus 100 connected to the corresponding power board 220 is mounted in the lower right space among the plurality of spaces of the docking station 200). The table of FIG. 6 is an embodiment, and the index of FIG. 6 may be different according to other embodiments.

Further, the processor 230 may transmit a plurality of image signals to the plurality of display apparatuses 100-1 through 100-n based on information on a space in which the plurality of display apparatuses 100-1 through 100-n are mounted.

Specifically, the processor 230 may divide an image received from the outside or a previously stored image into a plurality of images based on information on a space in which a plurality of display apparatuses 100-1 through 100-n are mounted. In addition, the processor 230 may transmit the plurality of divided images to the plurality of display apparatuses 100-1 through 100-n based on information on the space in which the plurality of display apparatuses 100-1 through 100-n are mounted.

For example, when the plurality of display apparatuses 100-1, 100-2, 100-3, and 100-4 in a 2×2 array as shown in FIG. 3 are mounted on the docking station 200, the processor 230 may divide the image into the first image corresponding to the first display apparatus 100-1 mounted in the upper left space, the second image corresponding to the second display apparatus 100-2 mounted in the upper right space, the third image corresponding to the third display apparatus 100-3 mounted in the lower left space, and the fourth image corresponding to the fourth display apparatus 100-4 mounted in the lower right space. Further, the processor 230 may transmit the first image to the first display apparatus 100-1, transmit the second image to the second display apparatus 100-2, and transmit the third image to the third display apparatus 100-3, and transmit the fourth image to the fourth display apparatus 100-4.

Accordingly, the plurality of display apparatuses 100-1 through 100-n mounted in each space of the docking station 200 may display an image based on the image signal. In other words, the plurality of display apparatuses 100-1 through 100-n may display a partial image corresponding to a location of a space in which each display apparatus is mounted from among the entire images.

The image transmission may be transmitted to the display apparatus through a transmission board provided in each space of the docking station 200.

Specifically, the processor 230 may transmit an image signal corresponding to each display apparatus to a transmission board provided in each space, and the transmission board provided in each space may transmit the image signal to the display apparatus. The image signal may be wirelessly transmitted to the display apparatus through an antenna included in the transmission board. However, according to an embodiment, the transmission board may be connected to the display apparatus through a cable, and may transmit the image signal to the display apparatus through the cable.

The processor 230 may receive a signal applied to the pin of the power board 220 electrically connected to the conductive member from the transmission board.

Specifically, the transmission board described above may be connected to the power board 220 through a first interface, and receive signals applied to the pins of the power board 220 electrically connected to the conductive member from the power board 220 through the first interface. In addition, the transmission board may be connected to the processor 230 through a second interface, and transmit signals applied to the pin of the power board 220 electrically connected to the conductive member to the processor 230 through the second interface.

However, this is only an embodiment, and the processor 230 may be connected to the power board 220 and may receive signals applied to the pin of the power board 220 from the power board 220.

The processor 230 may supply power to the display apparatus through pins other than pins electrically connected to the conductive member among the plurality of pins included in the power board 220.

Specifically, when a low signal is applied to at least one pin among the plurality of pins included in the interface 240, as the display apparatus is connected (or contacted) to the interface 240, the processor 230 may supply power to the display apparatus through the interface 240.

Figure 7:
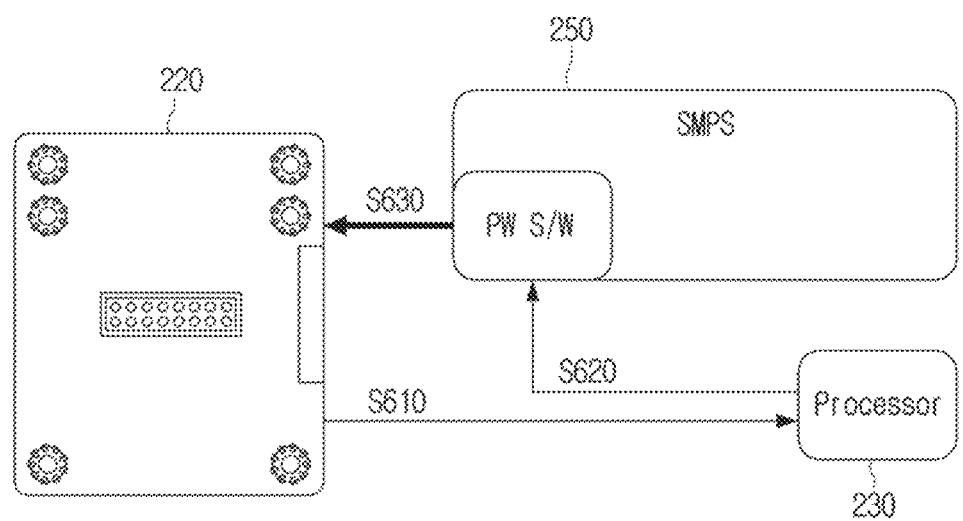
FIG. 7 is a view illustrating a power transmission flow according to an embodiment.

As an example, referring to FIG. 7, the processor 230 may monitor (operation S610) at least one pin (e.g., a third pin) of the power board 220 in contact with a pin included in the board for receiving power of the display apparatus 100.

The third pin may be a different pin from the first pin 221-1 and the second pin 221-2 described above.

In addition, in a state in which the first signal is applied to the third pin of the power board 220, as the pin included in the board for receiving power of the display apparatus 100 and the third pin contact each other, a second signal is applied to the third pin. The processor 230 may control a switching mode power supply (SMPS) 250 to supply power to the display apparatus (operation S620).

As an example, in a state in which a high signal is applied to the third pin of the power board 220, as the display apparatus contacts the power board 220, when a low signal is applied to the third pin, the processor may control the SMPS 250 to supply power to the display apparatus. For this operation, the third pin may be electrically connected to the pull-up resistor, and the pin of the display apparatus 100 in contact with the third pin may be electrically connected to the ground.

Accordingly, power may be supplied to the power board 220 (operation S630), and the power board 220 may supply power to the display apparatus in contact with the interface 240 of the power board 220.

In other words, the docking station 200 may supply power to the display apparatus 100 after the display apparatus 100 is mounted on the docking station 200.

Accordingly, the embodiment of the disclosure prevents unnecessary power consumption, and in particular, it is possible to prevent oxidation of the contact surface of the power board 220 that may occur when the display apparatus 100 contacts the power board 220 in a state in which power is not discharged.

Figure 8:
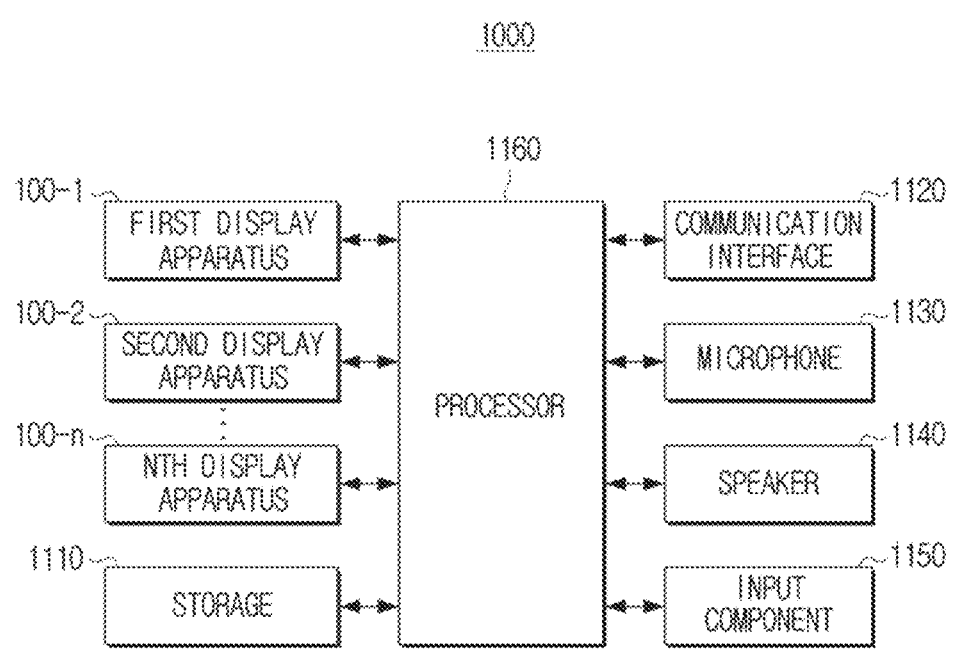
FIG. 8 is a block diagram illustrating a modular display apparatus according to an embodiment.

FIG. 8 is a block diagram illustrating a modular display apparatus according to an embodiment.

Referring to FIG. 8, a modular display apparatus 1000 according to an embodiment of the disclosure may include a first display apparatus 100-1, a second display apparatus 100-2, an n-th display apparatus 100-n, a storage 1110, a communication interface 1120, a microphone 1130, a speaker 1140, an input component 1150, and a processor 1160. In addition, the modular display apparatus 1000 may further include a back plate 210, a power board 220, and a transmission board. Hereinafter, portions overlapping with the above description will be omitted or abbreviated.

The storage 1110 may store an operating system (OS) for controlling the overall operation of components of the modular display apparatus 1000 and commands or data related to components of the modular display apparatus 1000.

Accordingly, the processor 1160 may control a plurality of hardware components or software elements of the display apparatus 1000 by using diverse commands or data in the storage 1110, load and process a command or data received from at least one of the other components in a volatile the memory, and store diverse data in a non-volatile memory.

The storage 1110 may be implemented with various types of storage media. For example, the storage 1110 may be implemented as a nonvolatile memory device such as read only memory (ROM), programmable read only memory (PROM), erasable programmable read only memory (EPROM), a flash memory, or may be implemented as a volatile memory device such as random access memory (RAM), or a storage device such as a hard disk or an optical disk.

The processor 1160 controls overall operations of the display apparatus 1000.

The processor 1160 may, for example, control a number of hardware or software elements connected to the processor 1160 by driving an operating system or application program, and perform various data processing and calculations. Further, the processor 1160 may load and process a command or data received from at least one of the other components to a volatile memory and store diverse data in a non-volatile memory.

For this operation, the processor 1160 may be realized a dedicated processor for performing functions (e.g., an embedded processor) or a generic-purpose processor for performing functions by running one or more software programs stored in a memory device (e.g., a CPU or an application processor). In addition, the processor 1160 may be included in the modular display apparatus 1000, and may be included in a control box connected to the modular display apparatus 1000. In addition, the processor 1160 may be electrically connected to a plurality of processors of the plurality of display apparatuses 100-1 through 100-n.

The processor 1160 may divide an image into a plurality of images corresponding to a plurality of display apparatuses in order to display the image received from an electronic device (e.g., a set-top box) through each of the plurality of display apparatuses. Further, the processor 1160 may transmit the plurality of divided images to the plurality of display apparatuses.

Specifically, the processor 1160 may be electrically connected to a plurality of power boards through a plurality of connectors. Further, the processor 1160 may obtain location information of the plurality of power boards electrically connected to the plurality of connectors, based on a signal applied to a pin of a power board electrically connected to a conductive member. For example, when a low signal is output from the first pin electrically connected to the conductive member and a high signal is output from the second pin electrically connected to the conductive member, the processor 230 may identify that the power board is located in the upper left space of the plurality of spaces of the docking station.

Further, the processor 1160 may transmit signals for controlling the plurality of display apparatuses connected to a plurality of interfaces of the plurality of power boards to the plurality of display apparatuses through a plurality of connectors based on the location information.

As an example, the processor 1160 may transit an image signal corresponding to a location of a space in which each display apparatus is mounted in a docking station to a plurality of transmission boards, and the plurality of transmission boards may transmit the image signal received from the processor 1160 to the plurality of display apparatuses, based on the location information. Accordingly, each of the plurality of display apparatuses may display an image based on the image signal received from each of the plurality of transmission boards.

The communication interface 1120 may transmit and receive various data by performing communication with an external device. For example, the communication interface 1120 may receive information regarding an image by communicating with the external device such as a smart phone, or receive a signal for controlling the modular display apparatus 1000 or a signal for controlling the external device. For this operation, the communication interface 1120 may include a wireless communication chip, a Wi-Fi chip, a Bluetooth chip, or the like.

The microphone 1130 may receive a user voice. Here, the user voice may be a voice for executing a specific function of the modular display apparatus 1000.

When the user voice for executing a specific function is received through the microphone 1130, the processor 1160 may convert the user voice into a digital signal through a speech to text (STT) algorithm and provide response information corresponding to the user voice. The response information may be received through an external server and may also be generated by the modular display apparatus 1000 itself.

The speaker 1140 may output various audio signals on which various processing tasks such as decoding, amplification, and noise filtering are performed by an audio processing unit. In addition, the speaker 1140 may output various notification sounds or voice messages.

The input component 1150 may be implemented as a touch screen, a touch pad, a key button, a keypad, or the like.

In addition, the modular display apparatus 1000 may further include a USB port to which a USB connector is connected, various external input ports for connecting various external terminals such as a headset, mouse, and LAN, and a Digital Multimedia Broadcasting (DMB) chip that receives and processes a DMB signal.

In addition, the modular display apparatus 1000 may further include a broadcast receiver for receiving a broadcast signal by wire or wirelessly from a broadcasting station or satellite, a signal separator that separates the broadcast signal received from the broadcast receiver into a video signal, an audio signal, and an additional information signal, and an A/V processing unit that performs video decoding and video scaling on an image signal and audio decoding on an audio signal.

Figure 9:
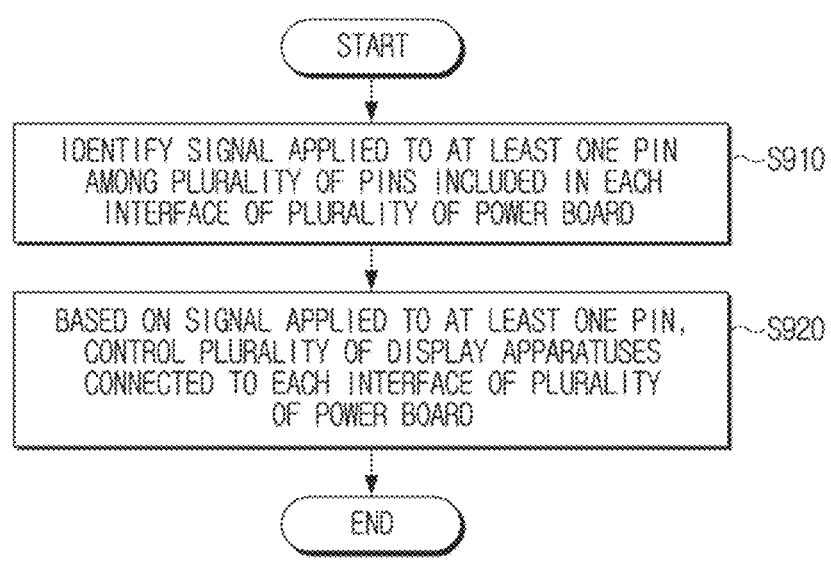
FIG. 9 is a flowchart illustrating a method of controlling a modular display apparatus according to an embodiment.

FIG. 9 is a flowchart illustrating a method of controlling a modular display apparatus according to an embodiment. Hereinafter, portions overlapping with the above description will be omitted or abbreviated.

The modular display apparatus 1000 of the disclosure may identify a signal applied to at least one pin among a plurality of pins included in each interface of a plurality of power boards (operation S910).

Specifically, the modular display apparatus 1000 of the disclosure may include a docking station divided into a plurality of spaces, a plurality of back plates provided in the plurality of spaces of the docking station, and a plurality of power boards provided on the plurality of back plates, and a plurality of conductive members may be included in a plurality of areas of each of the plurality of power boards.

The plurality of conductive members may be connected to at least one of the plurality of pins of the power board, and the plurality of areas of the back plate may be connected to ground.

Accordingly, different signals may be applied to at least one pin of the plurality of pins of the power board according to electrical contact between the plurality of conductive members provided in the plurality of areas of the power board and the plurality of areas of the back plate corresponding to the plurality of areas.

Specifically, when the conductive member provided in a first area of the plurality of areas of the power board is in electrical contact with a second area corresponding to the first area of the plurality of areas of the back plate, a low signal may be applied to a pin electrically connected to a conductive member provided in the first area among the at least one pin, and when the conductive member provided in a first area of the plurality of areas of the power board is not in electrical contact with a second area corresponding to the first area of the plurality of areas of the back plate, a high signal may be applied to a pin electrically connected to a conductive member provided in the first area among the at least one pin.

Further, the modular display apparatus 1000 of the disclosure may control a plurality of display apparatuses connected to respective interfaces of the plurality of power boards based on a signal applied to the at least one pin described above (operation S920).

Specifically, the area of the back plate in electrical contact with the plurality of conductive members of the power board may be different for each of the plurality of back plates according to a location of a space in which the back plate is provided in the docking station.

Accordingly, different signals may be applied to the pins of each power board disposed in different spaces of the docking station, and the modular display apparatus 1000 of the disclosure may identify a space in which the display apparatus is mounted based on a table in which information on different spaces is matched for each combination of the low signal and the high signal.

Further, the modular display apparatus 1000 of the disclosure may divide an image into a plurality of images corresponding to a plurality of display apparatuses based on information on a space in which the display apparatus is mounted, and transmit the divided plurality of images into the plurality of display apparatuses.

A non-transitory computer-readable medium in which a program sequentially performing the controlling method according to the disclosure is stored may be provided.

The non-transitory computer-readable medium refers to a medium that stores data semi-permanently and may be read by a device. In detail, the above-described various applications or programs may be stored in the non-transitory computer-readable medium such as, for example, a compact disc (CD), a digital versatile disc (DVD), a hard disc, a Blu-ray disc, a universal serial bus (USB), a memory card, a read only memory (ROM), and the like.

Although the embodiments of the disclosure have been disclosed for illustrative purposes, those skilled in the art will appreciate that various modifications, additions, and substitutions are possible, without departing from the scope and spirit of the disclosure as disclosed in the accompanying claims. Accordingly, such modifications, additions, and substitutions should also be understood to fall within the scope of the disclosure.

What is claimed is:

1. A modular display apparatus comprising:
a docking station having a plurality of spaces;
a plurality of back plates provided in the plurality of spaces;
a plurality of power boards provided on the plurality of back plates, each power board of the plurality of power boards including an interface including a plurality of pins;
a plurality of display apparatuses connected to the interfaces of the plurality of power boards and mounted in the plurality of spaces; and
a processor,
wherein a plurality of first areas of the plurality of power boards includes a plurality of conductive members,
wherein different signals are applied to at least one pin of the plurality of pins according to whether electrical contact exists between the plurality of conductive members provided in the plurality of first areas and a plurality of second areas of the plurality of back plates corresponding to the plurality of first areas,
wherein the processor is configured to identify respective positions of the plurality of spaces in which the plurality of display apparatuses are mounted based on a signal applied to the at least one pin included in the respective interfaces and control the plurality of display apparatuses based on the identified positions of the spaces,
wherein remaining pins other than the at least one pin included in the respective interfaces are configured to provide power to respective display apparatuses connected to the respective interfaces of the power boards,
wherein based on a conductive member provided in a first area among the plurality of first areas of a power board being in electrical contact with a second area among the plurality of second areas of a back plate corresponding to the first area, a low signal is applied to a pin electrically connected to the conductive member provided in the first area among the at least one pin, and
wherein based on the conductive member provided in the first area among the plurality of first areas of the power board not being in electrical contact with the second area among the plurality of second areas of the back plate corresponding to the first area, a high signal is applied to the pin electrically connected to the conductive member provided in the first area among the at least one pin.

2. The modular display apparatus of claim 1, wherein the plurality of first areas of the back plate are configured to be connected to a ground, wherein in an absence of electrical contact, a voltage greater than zero is applied to the at least one pin, and wherein in a presence of electrical contact, a voltage of zero is applied to the at least one pin as the at least one pin that is connected to the ground.

3. The modular display apparatus of claim 1, wherein areas of the plurality of back plates in electrical contact with the plurality of conductive members of the power board is different for each back plate of the plurality of back plates according to a location of a space in which the back plate is provided in the docking station.

4. The modular display apparatus of claim 1, further comprising:

a plurality of transmission boards connected to the plurality of power boards and the processor, the plurality of transmission boards being configured to transmit respective images to the plurality of display apparatuses, wherein the signal applied to the at least one pin is transmitted to the processor through the plurality of transmission boards, wherein the processor is configured to transmit a respective image signal corresponding to a respective location of a respective space in which each respective display apparatus is mounted in the docking station based on a respective applied signal to the respective display apparatuses through the plurality of transmission boards, and wherein each display apparatus of the plurality of display apparatuses is configured to display a respective image based on the respective image signal received from a respective transmission board.

5. The modular display apparatus of claim 4, wherein the image displayed by each display apparatus of the display apparatuses based on image signals received from each transmission board of the plurality of transmission boards is a partial image corresponding to a location of a space in which each display apparatus is mounted in the docking station among the images displayed through the plurality of display apparatuses.

6. The modular display apparatus of claim 1, wherein the processor is configured to, based on a signal change occurring in the at least one pin of the plurality of pins as the display apparatus is connected to the interface, supply power to the display apparatus connected to the interface of the power board through the remaining pins.

7. The modular display apparatus of claim 6, wherein the processor is configured to, based on a low signal being applied to the at least one pin as the display apparatus is connected to the interface, supply power to the display apparatus connected to the interface of the power board through the remaining pins.

8. The modular display apparatus of claim 1, wherein the processor is configured to:

electrically connect to the plurality of power boards through a plurality of connectors, based on the signal applied to the at least one pin, acquire location information of the plurality of power boards electrically connected to the plurality of connectors, and transmit signals for controlling the plurality of display apparatuses connected to the interfaces of the plurality of power boards to the plurality of display apparatuses through the plurality of connectors based on the location information.

9. The modular display apparatus of claim 8, wherein the processor is configured to:

based on the location information, transmit an image signal corresponding to a location of a space in which each display apparatus is mounted from the docking station to a plurality of transmission boards, and wherein each display apparatus of the plurality of display apparatuses is configured to display images based on the image signal received from each transmission board of the plurality of transmission boards.

10. A method of controlling a modular display apparatus, the method comprising:

identifying a signal applied to at least one pin of a plurality of pins included in respective interfaces of a plurality of power boards; and identifying respective positions of a plurality of spaces in which a plurality of display apparatuses are respectively mounted based on the signal applied to the at least one pin, and controlling the plurality of display apparatuses connected to the respective interfaces of the plurality of power boards based on the identified positions of the plurality of spaces, wherein the modular display apparatus comprises:
a docking station having the plurality of spaces;
a plurality of back plates provided in the plurality of spaces; and
the plurality of display apparatuses connected to the respective interfaces and mounted in the plurality of spaces, wherein the plurality of power boards are provided on the plurality of back plates, wherein a plurality of first areas of the plurality of power boards includes a plurality of conductive members, wherein different signals are applied to the at least one pin of the plurality of pins according to whether electrical contact exists between the plurality of conductive members provided in the plurality of first areas and a plurality of second areas of the plurality of back plates corresponding to the plurality of first areas, wherein remaining pins other than the at least one pin included in the respective interfaces are configured to provide power to the respective display apparatuses connected to the respective interfaces of the power boards, wherein based on a conductive member provided in a first area among the plurality of first areas of a power board being in electrical contact with a second area among the plurality of second areas of a back plate corresponding to the first area, a low signal is applied to a pin electrically connected to the conductive member provided in the first area among the at least one pin, and wherein based on the conductive member provided in the first area among the plurality of first areas of the power board not being in electrical contact with the second area among the plurality of second areas of the back plate corresponding to the first area, a high signal is applied to the pin electrically connected to the conductive member provided in the first area among the at least one pin.

11. The method of claim 10, wherein the plurality of first areas of the back plate are configured to be connected to a ground, wherein in an absence of electrical contact, a voltage greater than zero is applied to the at least one pin, and wherein in a presence of electrical contact, a voltage of zero is applied to the at least one pin as the at least one pin that is connected to the ground.

12. The method of claim 10, wherein areas of the plurality of back plates in electrical contact with the plurality of conductive members of the power board is different for each back plate of the plurality of back plates according to a location of a space in which the back plate is provided in the docking station.

13. The method of claim 10, further comprising:
transmitting a respective image signal corresponding to a respective location of a respective space in which each respective display apparatus is mounted in the docking station based on a respective applied signal to the respective display apparatuses through a plurality of transmission boards, and
wherein each display apparatus of the plurality of display apparatuses is configured to display a respective image based on the respective image signal received from a respective transmission board of the plurality of transmission boards.

14. The method of claim 13, wherein the image displayed by each display apparatus of the display apparatuses based on image signals received from each transmission board of the plurality of transmission boards is a partial image corresponding to a location of a space in which each display apparatus is mounted in the docking station among the images displayed through the plurality of display apparatuses.

15. The method of claim 10, wherein the supplying power comprises, based on a signal change occurring in the at least one pin of the plurality of pins as the display apparatus is connected to the interface, supplying power to the display apparatus connected to the interface of the power board through the remaining pins.

16. The method of claim 15, wherein the supplying power comprises, based on a low signal being applied to the at least one pin as the display apparatus is connected to the interface, supplying power to the display apparatus connected to the interface of the power board through the remaining pins.

17. The method of claim 10, further comprising:
based on the signal applied to the at least one pin, acquiring location information of the plurality of power boards electrically connected to a plurality of connectors, and
transmitting signals for controlling the plurality of display apparatuses connected to the interfaces of the plurality of power boards to the plurality of display apparatuses through the plurality of connectors based on the location information.

18. The method of claim 17, wherein the transmitting comprises, based on the location information, transmitting an image signal corresponding to a location of a space in which each display apparatus is mounted from the docking station to a plurality of transmission boards, and
wherein each display apparatus of the plurality of display apparatuses is configured to display images based on the image signal received from each transmission board of the plurality of transmission boards.

\* \* \* \* \*